United States Patent
Holliday et al.

(10) Patent No.: US 8,307,700 B2
(45) Date of Patent: Nov. 13, 2012

(54) INTERNAL POSITION AND LIMIT SENSOR FOR FREE PISTON MACHINES

(75) Inventors: Ezekiel S. Holliday, Belpre, OH (US); James Gary Wood, Albany, OH (US)

(73) Assignee: Sunpower, Inc., Athens, OH (US)

( * ) Notice: Subject to any disclaimer, the term of this patent is extended or adjusted under 35 U.S.C. 154(b) by 302 days.

(21) Appl. No.: 12/845,998

(22) Filed: Jul. 29, 2010

(65) Prior Publication Data

US 2011/0203360 A1     Aug. 25, 2011

Related U.S. Application Data

(60) Provisional application No. 61/305,986, filed on Feb. 19, 2010.

(51) Int. Cl.
    *G01M 15/00*      (2006.01)
(52) U.S. Cl. .................................. 73/114.77; 73/114.28
(58) Field of Classification Search ............... 73/114.28, 73/114.77; 324/207.11–207.24
See application file for complete search history.

(56) References Cited

U.S. PATENT DOCUMENTS

| | | | | |
|---|---|---|---|---|
| 4,577,509 | A | * | 3/1986 | Moser .............................. 73/658 |
| 4,587,850 | A | * | 5/1986 | Moser .............................. 73/658 |
| 4,667,158 | A | | 5/1987 | Redlich |
| 4,866,378 | A | | 9/1989 | Redlich |
| 4,912,409 | A | | 3/1990 | Redlich et al. |
| 4,926,123 | A | | 5/1990 | Redlich |
| 6,199,381 | B1 | * | 3/2001 | Unger et al. .................... 60/520 |
| 6,351,117 | B1 | * | 2/2002 | Ehling ...................... 324/207.13 |
| 6,919,719 | B2 | * | 7/2005 | Reininger ................... 324/207.2 |
| 7,075,292 | B2 | * | 7/2006 | Berchowitz et al. ........ 324/207.2 |
| 7,202,658 | B2 | * | 4/2007 | Ketelaars et al. ......... 324/207.24 |
| 7,372,255 | B2 | * | 5/2008 | Holliday .................. 324/207.24 |
| 8,018,222 | B2 | * | 9/2011 | Karenowska et al. ... 324/207.16 |
| 8,151,636 | B2 | * | 4/2012 | Siraky ......................... 73/114.28 |
| 2003/0030431 | A1 | * | 2/2003 | Reininger .................. 324/207.2 |

* cited by examiner

*Primary Examiner* — Freddie Kirkland, III
(74) *Attorney, Agent, or Firm* — Frank H. Foster; Kremblas & Foster

(57) ABSTRACT

A sensor for sensing the position of a reciprocating free piston in a free piston Stirling machine. The sensor has a disk mounted to an end face of the power piston coaxially with its cylinder and reciprocating with the piston The disk includes a rim around its outer perimeter formed of an electrically conductive material A coil is wound coaxially with the cylinder, spaced outwardly from the outer perimeter of the disk and mounted in fixed position relative to the pressure vessel, preferably on the exterior of the pressure vessel wall.

19 Claims, 5 Drawing Sheets

Fig. 8
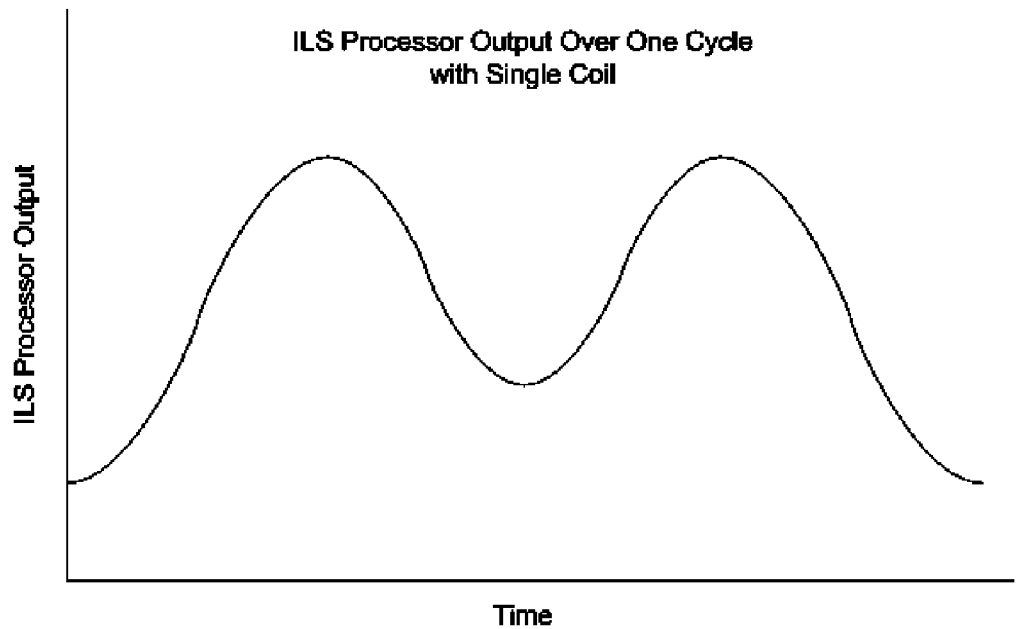
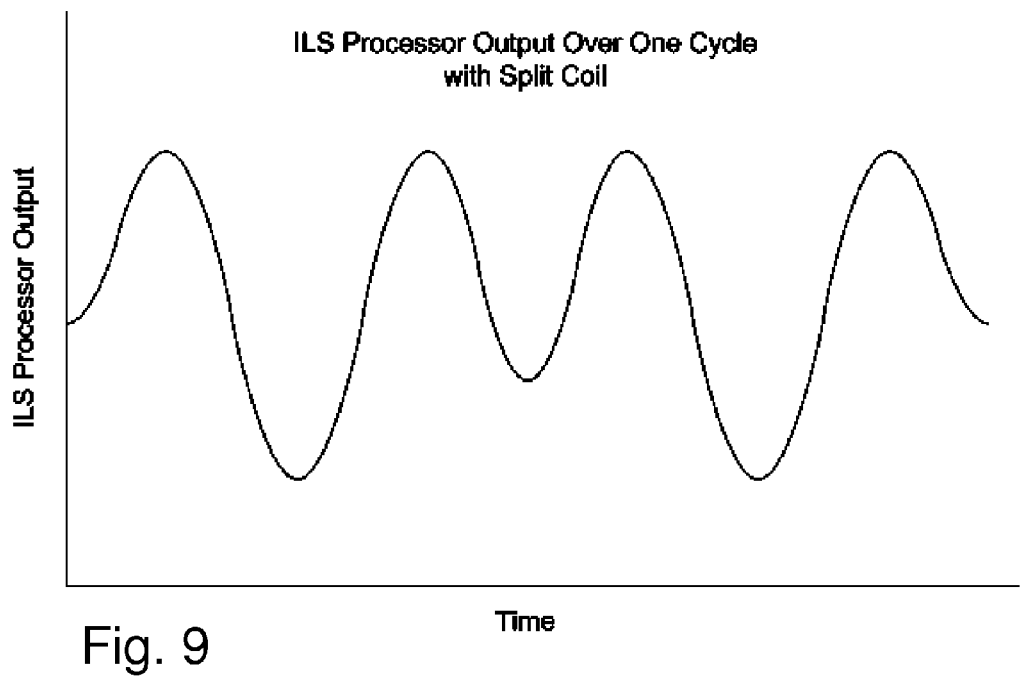
Fig. 9

INTERNAL POSITION AND LIMIT SENSOR FOR FREE PISTON MACHINES

CROSS-REFERENCES TO RELATED APPLICATIONS

This application claims the benefit of U.S. Provisional Application No. 61/305,986 filed Feb. 19, 2010. The above prior application is hereby incorporated by reference.

STATEMENT REGARDING FEDERALLY-SPONSORED RESEARCH AND DEVELOPMENT

This invention was made with Government support under contract NAS3-03128 awarded by NASA. The Government has certain rights in the invention.

REFERENCE TO AN APPENDIX (Not Applicable)

BACKGROUND OF THE INVENTION

This invention relates to free-piston Stirling engines, coolers and heat pumps and more particularly relates to a position sensor for sensing the position of the reciprocating power piston of such a free-piston machine. The sensor has an advantage that it adds only insignificantly to the length of the free-piston machine. Also it has the advantage that the coil part of the sensor, which provides the electrical output signal, can be mounted to the exterior of the pressure vessel head of the free-piston machine so that it does not require that any electrical conductors be fed through the pressure vessel.

Provisional patent application Ser. No. 61/305,986, filed Feb. 19, 2010 and from which priority is claimed, is hereby incorporated in this application by reference. U.S. Pat. Nos. 4,667,158; 4,866,378; and 4,912,409 are also hereby incorporated by reference.

Free-piston Stirling machines are thermo-mechanical oscillators that are well known in the prior art. Free piston Stirling machines offer numerous advantages including the ability to control their frequency, phase and amplitude, the ability to be hermetically sealed from their surroundings and their lack of a requirement for a mechanical fluid seal between moving parts to prevent the mixing of the working gas and lubricating oil. Generally, a free-piston Stirling machine includes a power piston that reciprocates in a cylinder and is attached to a spring to form a resonant system. The power piston is also attached to a load, when the Stirling machine is operated as an engine, and to a reciprocating prime mover for driving the piston in reciprocation when the Stirling machine is operated as a heat pump or cooler. In a free-piston Stirling machine the piston, and a displacer if there is one, are not connected to each other or to a load or prime mover by a mechanical linkage that confines their reciprocation to a fixed stroke, for example connecting rods and crankshafts. Instead, the stroke of the oscillating piston is free to vary.

Free-piston machines are typically designed with the piston having a nominal design stroke. However, as the machine encounters varying operating parameters, such as varying loads or varying operating temperatures, the piston stroke varies away from the nominal design stroke since its stroke is not confined by mechanical linkages. If the operating stroke increases sufficiently, the piston can collide with other mechanical structures of the machine such as a displacer or parts fixed at axially opposite ends of the cylinder in which the piston reciprocates.

Because of the variations in stroke as a function of operating parameters and the possibility of collisions, free-piston machines commonly have an electronic control system. One of the most important parameters that are sensed and used by the control system is the linear position of the piston. For example, sometimes it is desirable to sense the instantaneous linear position or translation of the piston as it reciprocates through its cyclic motion and/or to sense the opposite end limits of the piston reciprocation.

The above three cited U.S. patents to Robert W. Redlich show a position sensor that has an elongated coil and a tube that reciprocates in and out of the coil. The inductance and therefore the impedance of the coil decreases as a function of the length of insertion of the tube into the coil. Although the Redlich sensor is effective, it occupies a length within the Stirling machine that is on the order of at least twice the stroke of the piston. The reason is that, in order to sense the position along the entire stroke, both the coil and the tube must have a length at least equal to the stroke. The tube must be able to reciprocate between a position of maximum withdrawal from the coil to a position of maximum insertion into the coil and the distance between maximum withdrawal and maximum insertion must be at least equal to the stroke. Consequently, the length of the entire Redlich sensor must be at least twice the length of the stroke at the position of maximum withdrawal. In addition to the length of the Redlich sensor, the design of the Stirling machine must provide for locating both the coil and the reciprocating tube within the machine. Consequently, the Redlich sensor adds volume and length requirements to a free-piston Stirling machine. Furthermore, because the coil of the Redlich sensor must be located within the hermetically sealed pressure vessel of the Stirling machine, the electrical conductor leads from the coil must extend through the pressure vessel wall for connection to control circuitry. That reduces the reliability of the machine because such electrical feedthroughs must be sealed to withstand a high pressure. The seals provide an additional failure risk.

It is an object and feature of the present invention to provide a position sensor that adds only negligibly to the length and volume of a free-piston Stirling machine.

Another object and feature of the invention is to provide an embodiment of the invention that requires no electrical conductor leads extending through the pressure vessel.

BRIEF SUMMARY OF THE INVENTION

The invention is a sensor for sensing the translation or position of a reciprocating free piston in a free piston Stirling machine. The Stirling machine, as well known in the art, has an outer pressure vessel for containing a working gas and at least one power piston freely reciprocatable in a cylinder within the pressure vessel at a nominal designed maximum stroke along an axis of reciprocation. The invention has a disk mounted to an end face of the piston coaxially with the cylinder and reciprocating with the piston. The disk includes a rim around its outer perimeter formed of an electrically conductive material and preferably is entirely formed of an electrically conductive material. A coil is wound coaxially with the cylinder, spaced outwardly from the outer perimeter of the disk and mounted in a fixed position relative to the pressure vessel, preferably on its exterior. The disk is considerably shorter in its axial direction than the coil. Preferably, the coil has a length at least substantially equal to the nominal designed maximum stroke of the piston and is substantially centered at the center of the nominal designed maximum stroke. There are two preferred embodiments of the coil, the distributed coil and the end concentrated coil.

BRIEF DESCRIPTION OF THE SEVERAL VIEWS OF THE DRAWINGS

FIG. 8 is a graph illustrating the output signal from the detecting circuit of FIG. 7 as a function of time for the distributed coil embodiment of the invention.

FIG. 9 is a graph illustrating the output signal from the detecting circuit of FIG. 7 as a function of time for the end concentrated coil embodiment of the invention.

FIG. 10 is a diagram showing the two different coil arrangements.

Figures 1, 2:
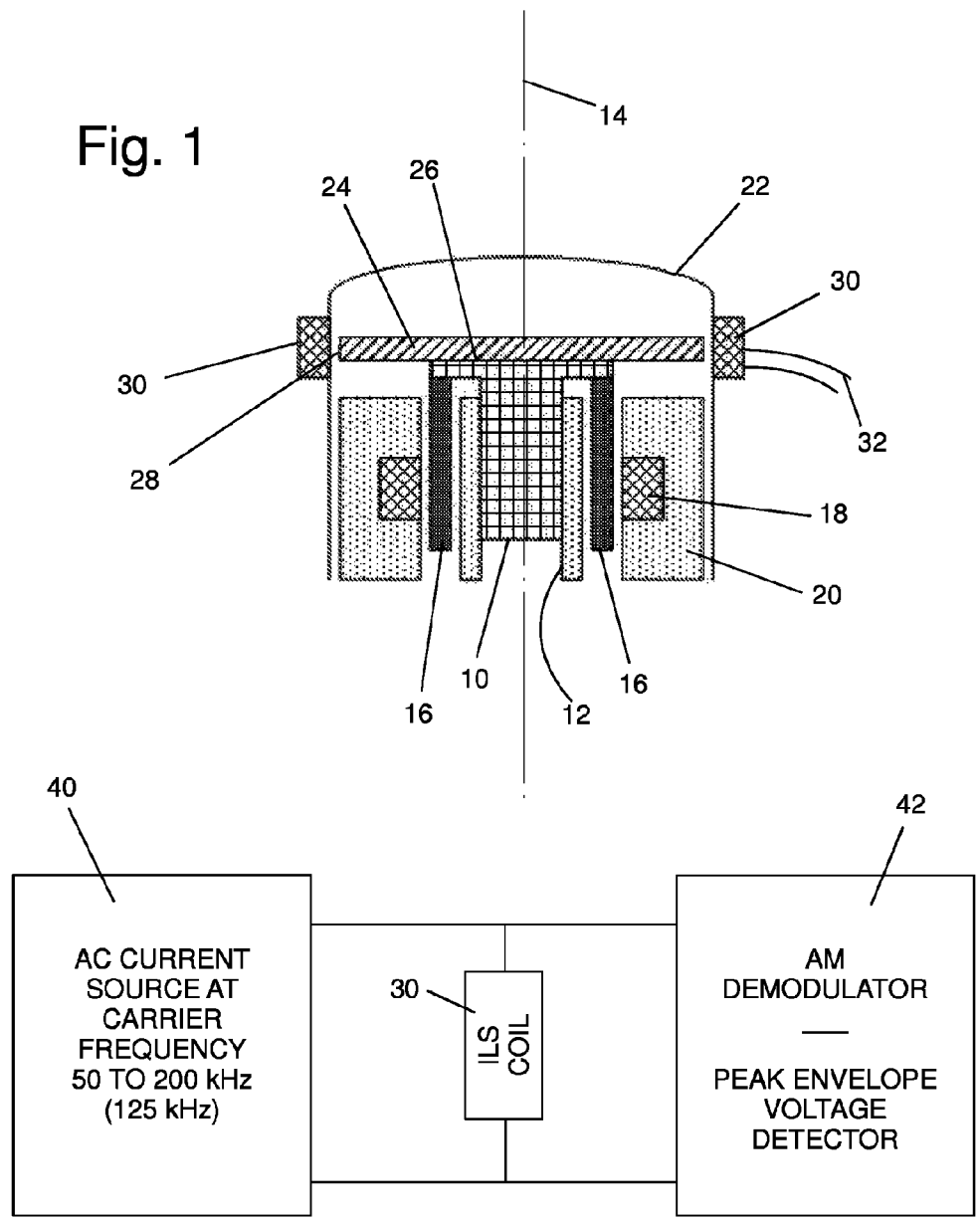
FIG. 1 is a diagrammatic view in axial section of a portion of a free-piston Stirling machine having an embodiment of the invention installed on it.
FIG. 2 is a block diagram of a simplified coil and sensor circuit embodying the invention and illustrating its principles of operation.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

FIG. 1 diagrammatically illustrates an embodiment of the invention mounted to a free-piston Stirling machine that is known in the prior art. The prior art components of the Stirling machine include a power piston 10 that reciprocates in a cylinder 12 along an axis 14. As also known in the prior art, a magnet or series of magnets 16 are arranged in an annular configuration around the axis 14. The magnets 16 are attached to the piston 10 so that the magnets 16 reciprocate with the piston 10 within an armature comprising an armature coil 18 and a low reluctance, ferromagnetic core 20. These components are housed within an outer pressure vessel 22 that is hermetically sealed and contains the working gas of the Stirling machine. As known in the art, the structure of FIG. 1 may be operated as a linear alternator driven by a Stirling engine or as a Stirling cooler or heat pump driven by an electric linear motor. As also well known in the art, the power piston alternatively may be connected to other loads or prime movers.

The invention is a sensor for sensing the position of the reciprocating free piston 10 along its axis 14 of reciprocation. The sensor has a disk 24 that is mounted to an end face 26 of the piston 10 coaxially with the cylinder 12 and reciprocating with the piston 10. The disk 24 has a rim 28 around its outer perimeter formed of an electrically conductive material, such as aluminum, which is preferred because of its high conductivity. Although it is necessary only that this outer rim 28 be an electrical conductor, ordinarily it is desirable to make the entire disk of metal.

A sensor coil 30 is wound coaxially with the cylinder 12 and is spaced outwardly from the outer perimeter 28 of the disk 24 and mounted in fixed position relative to the pressure vessel. In the embodiment of FIG. 1, the coil is mounted around the exterior of the pressure vessel 22 and the pressure vessel is constructed of a non-ferromagnetic material, such as stainless steel or Inconel, so that it does not have any significant effect upon the magnetic coupling between the disk 24 and the coil 30. The coil 30 has conductor leads 32 for connection to a detector circuit. Alternatively, the coil may be wound around the interior of the pressure vessel but that has the disadvantage of requiring that the conductor leads extend through and be sealed to the wall of the pressure vessel 22. However, it has the advantage that magnetic coupling between the disk and the coil is greater. It is also preferred to have an annular ferromagnetic shield positioned outwardly of the coil in order to avoid interference from stray electromagnetic fields and to maximize the magnetic coupling between the disk and the coil.

The basic principle of operation is that the inductive reactance, and therefore the impedance, of the coil changes as a function of the position of the disk within or near the ends of the coil. The inductive reactance of the coil is a decreasing function of the magnetic coupling between the disk and the coil; that is, the greater the magnetic flux (from coil current) at the location of the disk, the lower the inductive reactance of the coil. The length of the coil 30 is at least substantially equal to the nominal designed maximum stroke of the piston 10 and the coil is substantially centered at the center of the nominal designed maximum stroke. An example of a typical piston stroke is 10 mm, although the design stroke varies considerably depending upon the size and purpose of the free-piston Stirling machine. The pressure vessel of a free-piston Stirling machine may have a diameter on the order of 10 to 30 cm, similarly depending upon the size and purpose of the machine. Consequently, the coil 30 has an aspect ratio of diameter to length that makes it a short coil. The coil diameter is so much larger than the coil length that coil end effects exist through the entire length of the coil. Therefore, the magnetic flux in the coil and the magnetic coupling between the coil and the disk varies along the axis of the entire coil. There is essentially no increment of disk translation that does not cause a variation in the impedance of the coil.

Referring to FIG. 2, an alternating current source 40 at a carrier frequency on the order of 50 kHz to 200 kHz is applied to the coil. The alternating current induces eddy currents around the periphery of the disk causing the disk to act like a short circuited secondary of a transformer. The magnetic field for the eddy currents is magnetically coupled to the coil 30 reducing the coil reactance in response to increasing magnetic coupling. Magnetic coupling is at its maximum when the disk is centered in a coil that has its turns distributed along its entire length. Therefore the impedance of the coil varies at a function of the magnetic coupling between the disk and the coil and is at its minimum when the disk is centered in a coil that has its turns distributed along its entire length. As the disk moves within the coil, the amplitude of the voltage across the coil at the carrier frequency varies as a function of the disk position because the AC source 40 is a constant current source and the coil's impedance is varying as a function of disk position. That amplitude variation is detected by an amplitude modulation demodulator 42 to provide an envelope signal that is a function of disk position.

As the magnetic coupling between the disk and the coil increases, the resistive losses resulting from the eddy currents in the disk cause the apparent resistance seen at the coil terminals to increase. However, the decrease in the reactive component of coil impedance is dominant and considerably greater than the increase in the resistive component of apparent coil impedance.

Disk

Preferably, the disk 24 is circular and has a thickness in the axial direction of no more than 30 percent of the nominal designed maximum stroke and most preferably is 10 percent of the stroke. Also, the radial dimension perpendicular to the axis, or the radius for a perfectly circular disk, is greater than the thickness of the disk in the axial direction. More preferably, the radial dimension is at least 10 times larger than the axial thickness of the disk. It is this aspect ratio of the disk and the relatively small thickness of the disk that allows the sensor of the invention to add so little to the length of the Stirling machine. The thickness of the disk is subject to engineering tradeoffs. A thinner disk will provide greater resolution. However, it is also desirable that the disk be stiff enough that it not flex significantly as a result of the alternating acceleration and deceleration of the piston's reciprocation. We have used a disk with a thickness of about 2 mm, for example.

Whether the coil is positioned interiorly or exteriorly of the pressure vessel, it is desirable that the disk extend radially outwardly to place its outer periphery as close as practical to the coil in order to maximize magnetic coupling between them. For an external coil that means as close as practical to the pressure vessel wall. Practical means as close as engineering judgment permits without risk of making physical contact in view of the radial motion tolerances of the design.

Figure 3:
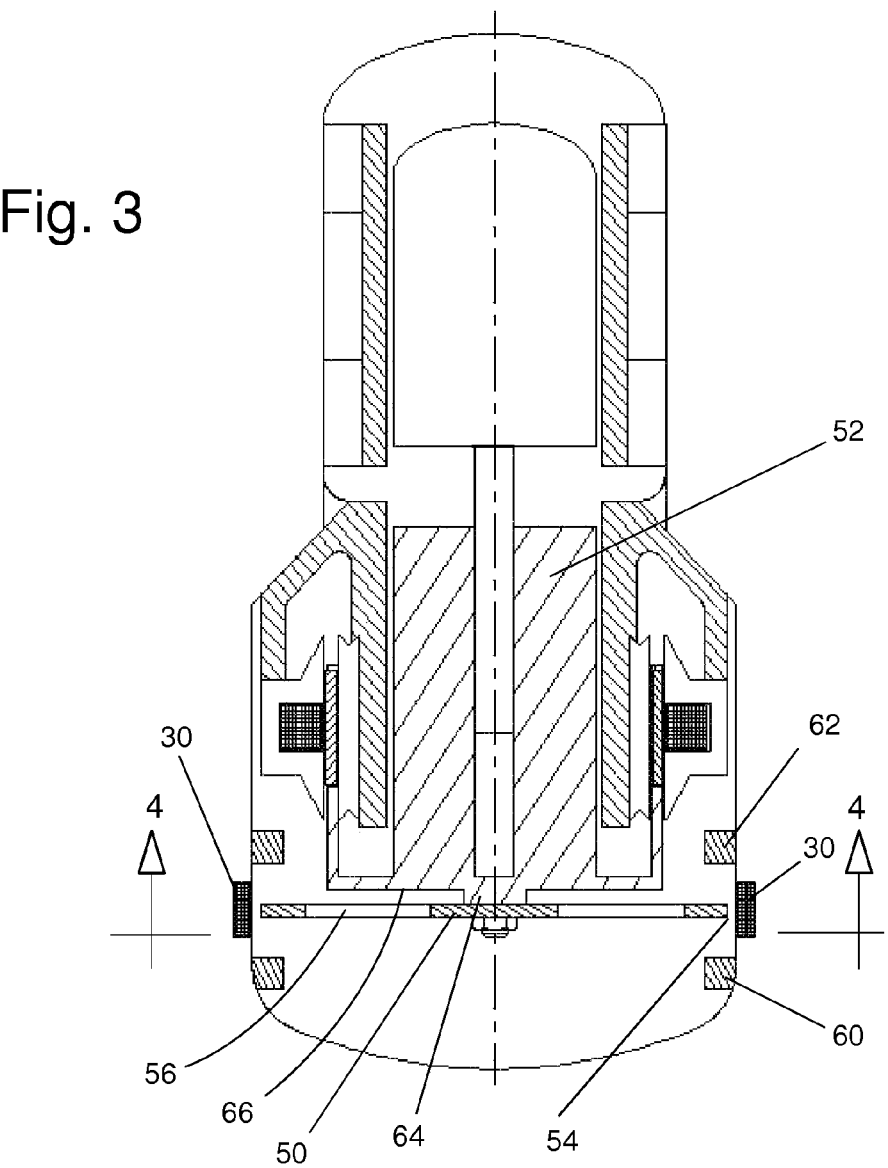
FIG. 3 is a view in axial section of a free-piston Stirling machine having another embodiment of the invention installed on it.
Figure 4:
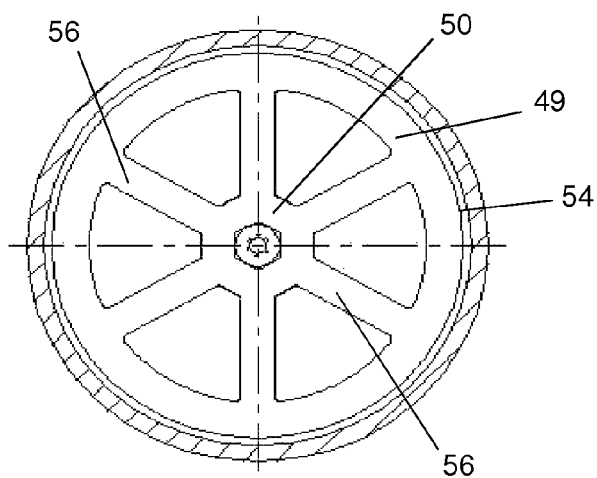
FIG. 4 is a view in section of the embodiment of FIG. 3 and taken substantially along the line 4-4 of FIG. 3.

Although the disk may be constructed of a single, imperforate sheet of conductive material, there are advantages to forming the disk with perforations and particularly in a wheel configuration. Placing perforations in the disk allows the working gas to move more freely within the Stirling machine and thereby reduces pumping losses. FIGS. 3 and 4 illustrate a free-piston Stirling machine with a disk 49 advantageously formed with a central hub 50 mounted to the piston 52 and an outer peripheral rim 54 with spokes 56 joining the hub 50 to the rim 54.

Another advantage of the disk of the present invention, particularly in the spoked configuration, is that it can also serve as a bumper for cushioning the piston 52 at opposite ends of its reciprocation if its stroke exceeds a maximum permissible stroke. For cushioning such an overstroke, at least a pair of annular stops 60 and 62 are mounted within the pressure vessel 64 on opposite sides of the disk 49 in fixed positions relative to the pressure vessel 64. The stops 60 and 62 are spaced apart a distance equal to the maximum nominal design permissible stroke. The stops 60 and 62 are fixed equidistantly on axially opposite sides of the center of the nominal designed maximum stroke and aligned to be contacted by the rim 54 of the disk 49 in the event the stroke exceeds the maximum nominal design permissible stroke. The stops 60 and 62 can alternatively be discontinuous stops placed at intervals and annularly distributed for similar contact with the rim 54 of the disk 49.

The radial spokes function like leaf springs. Any substantial overstroke deflects the spokes and gradually absorb the kinetic energy of the piston as it is brought to a stop. Then the spoke springs release the stored kinetic energy giving the piston a push back in the opposite direction. To further enhance this advantageous feature, the disk 49 may be constructed of two different materials. The rim 54 may be formed of a conductive material that has more conductivity than the spokes 56 and the spokes may be formed of a spring material. With such a two part construction of the disk 49, the rim is typically made to have a radial width that is 5% to 15% of the radius of the disk 49.

In order to maximize the advantage from the above spring and bumper effect, a spacer 64 is coaxially interposed between the hub 50 of the disk 49 and the end face 66 of the piston 52. The spacer 64 has a diameter less than the diameter of the piston 52 so that the spokes 56 may flex between the rim 50 and the spacer 64. The disk 49 is attached to the piston 52 by a machine screw or nut through a central bore coaxially through the hub 50.

Coil

The coil used in the sensor of the invention can be made in multiple different embodiments. The two most significant are the distributed coil and the end concentrated coil. The difference is the distribution of the windings of the coil along the length of the coil.

FIG. 10 illustrates these two coil embodiments. In the distributed coil embodiment 30A, the turns of the coil are distributed along the entire length of the coil, preferably uniformly distributed. In the concentrated coil embodiment 30B, the windings are concentrated at the ends of the coil. Preferably, the concentrated coil may be considered as two short coil components each coil component preferably centered at opposite ends of the design maximum nominal operating stroke but connected in series. Preferably, the length of each of the two short coil components is approximately 25% of the piston stroke with the series connection extending between the two coil components.

Although the number of turns in either coil embodiment is not critical, the greater the number of turns the greater the change in impedance as a function of disk position within the coil. Consequently, the choice of the number of turns is an engineering tradeoff between enough turns to obtain a useful signal and not so many turns that give a diminished benefit for the additional turns.

The length of the coil is substantially the length of the maximum nominal operating stroke. The considerations are these. A free piston Stirling machine may be designed to operate at a single stroke. The nominal stroke is the stroke at which it is designed to operate. The preferred length of the coil is at least the length of the stroke with the ends of the coil being positioned radially outwardly from the disk at the end positions of that stroke. However, as with so many parameters in engineering and science, a small amount of departure makes only a small difference in operation so the device continues to be practical and useful over a range extending on either side of the preferred length and positioning. That is true with this invention. Although it is preferred that the coil length equal or exceed the nominal design stroke, it is not necessary that it be exactly equal to the nominal stroke. The coil length can be more or less than the nominal stroke but as the coil length departs farther from the stroke length, the desirable characteristics and features of the invention become progressively reduced. We believe that the invention remains practical and effective for coil lengths in the range of 90% to 110% of the stroke length and prefer that the coil be slightly longer than the design stroke. We believe that a significant departure from that range might causes a deterioration of operational effectiveness or unnecessarily occupy additional space within the pressure vessel. However, the coil may be extended further when it is desired to sense piston position over a wider range of piston position. Some free-piston Stirling machines are designed to operate with a varying stroke that varies over a nominal design range. In that case, however, the length of a single coil embodiment of the invention would preferably be the maximum stroke within the nominal design stroke range with departures possible from that value as described above.

Operation and Detection Circuit

Figure 5:
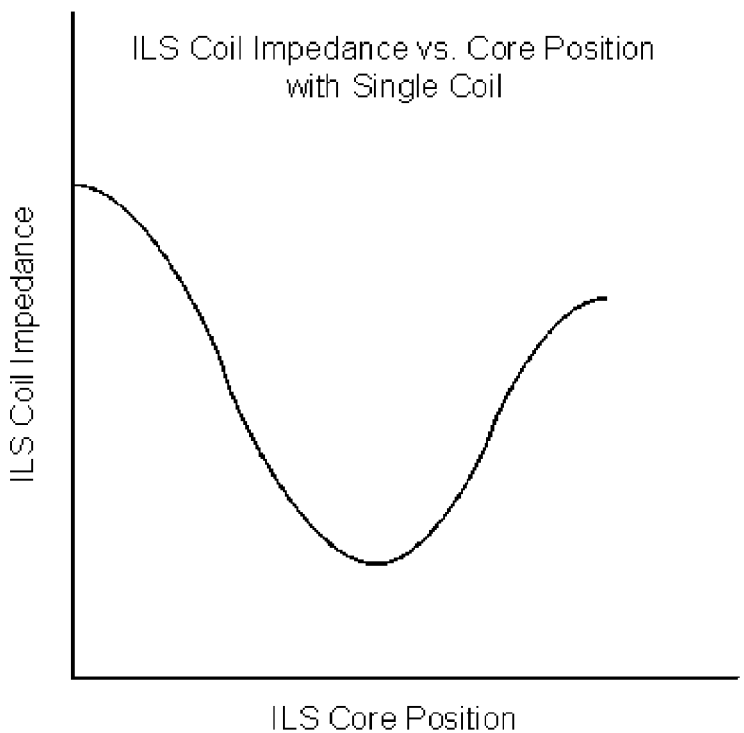
FIG. 5 is a graph illustrating the apparent coil impedance as a function of piston position for the distributed coil embodiment of the invention.

FIG. 5 is a graph illustrating the variation of coil impedance as a function of disk position in the distributed coil embodiment, referred to on the graph as the single coil. The graph shows the impedance variation as the piston moves from one end of its stroke to the opposite end of its stroke in a substantially sinusoidal motion that is characteristic of the piston motion. As can be seen on FIG. 5, the impedance of the coil varies approximately sinusoidally as a function of disk position because the distribution of magnetic flux within the coil has a sinusoidal distribution from one end to the other. Because the impedance is reduced by the presence of the disk, the minimum impedance occurs when the disk is at the center of the coil where the magnetic flux is maximum. The graph is horizontally asymmetrical because of the parasitic effect of the presence of the piston which alternately moves closer and farther from the coil and is itself a large conductive mass positioned close to the disk. An additional parasitic effect results from the fact that the internal structures of a free-piston machine are asymmetrical in the axial direction.

Figure 6:
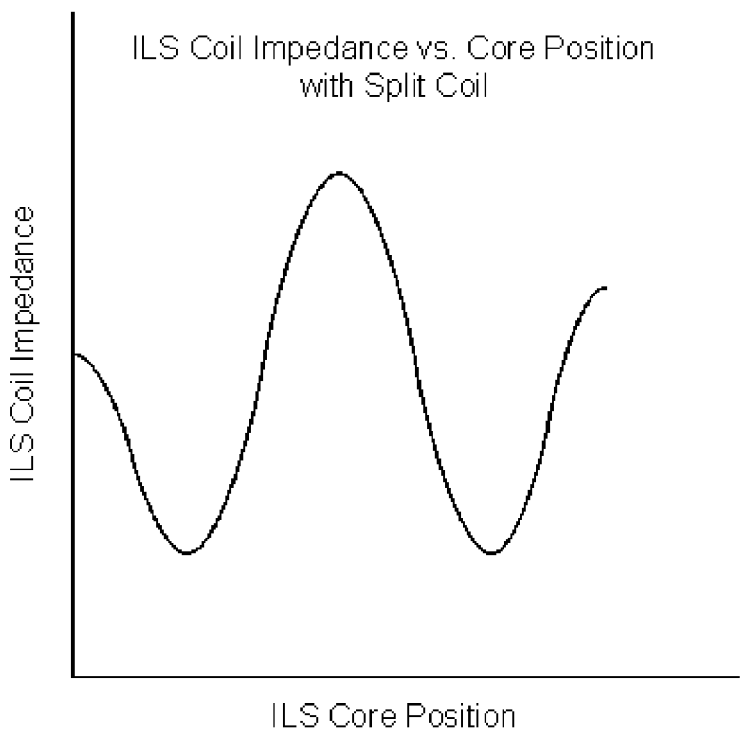
FIG. 6 is a graph illustrating the apparent coil impedance as a function of piston position for the end concentrated coil embodiment of the invention.

FIG. 6 is a graph illustrating the variation of coil impedance as a function of disk position in the end concentrated embodiment of the invention as the piston moves from one end of its stroke to the opposite end of its stroke in a substantially sinusoidal motion. The graph of FIG. 6 shows that the apparent coil impedance decreases as the disk approaches the center of one of the two concentrated coil components, increases as the disk approaches the center of the concentrated coil between the two coil components. After the disk passes the center of the coil between the two concentrated coil components and approaches closer to the second coil component, the impedance decreases until the disk reaches the center of the second coil component and then increases as the disk moves toward the end of the coil.

Figure 7:
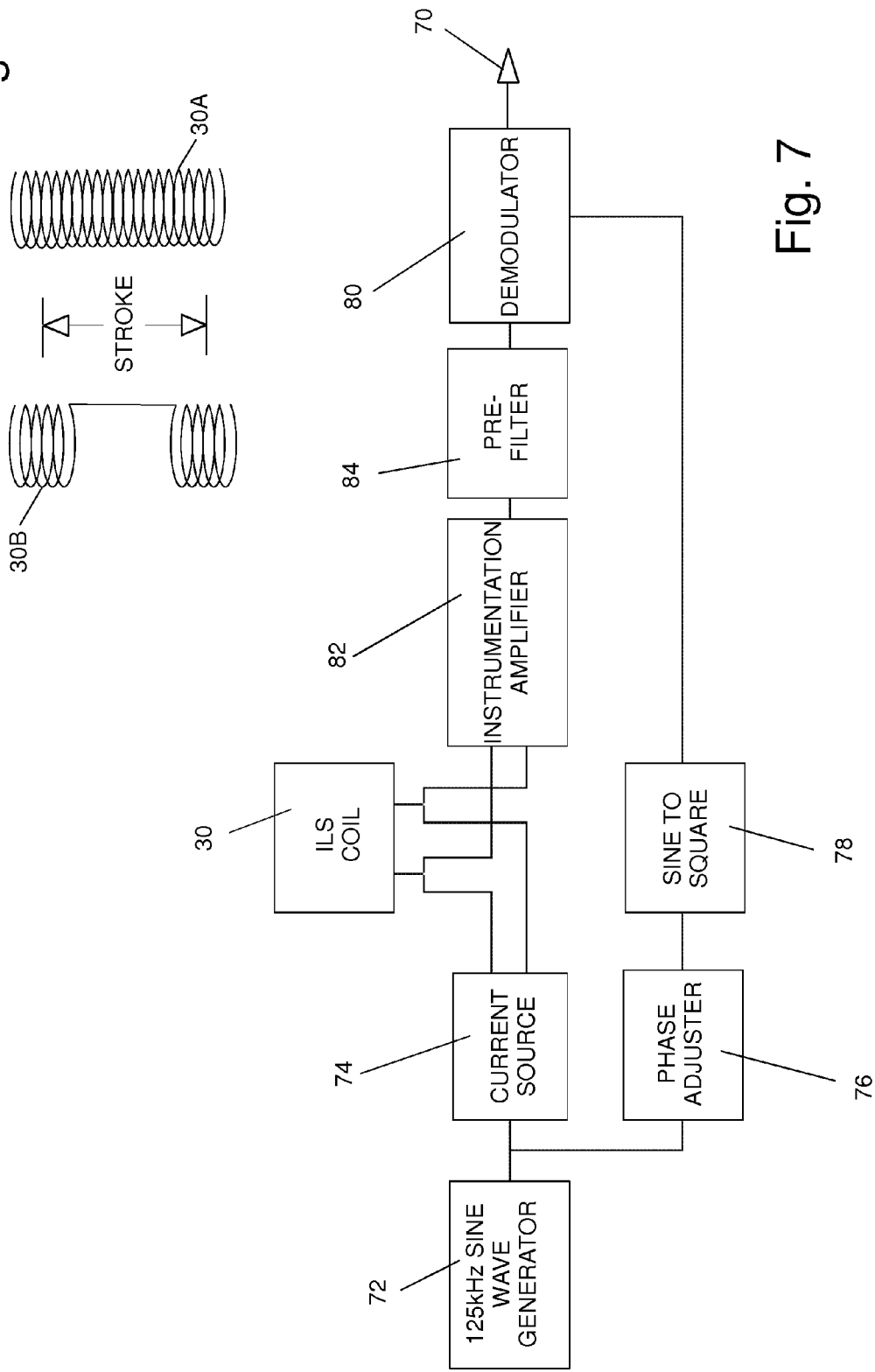
FIG. 7 is a block diagram of a coil and a detecting circuit for detecting a signal from the coil that is a function of piston position.

FIG. 7 illustrates a preferred circuit for detecting a signal that is a function of piston position. A 125 kHz sine wave generator drives a current source to apply a 125 kHz current source current through the coil 30. Because the coil is driven by an AC current source, the amplitude of the sinusoidal, 125 kHz AC voltage across the coil will be proportional to the coil impedance. In other words, the voltage across the coil at the carrier frequency of 125 Khz is amplitude modulated by the instantaneous value of the coil impedance. Consequently, the voltage across the coil can be amplified, filtered and demodulated by an AM demodulator to provide at its output 70 a signal that is proportional to the coil impedance. Because coil impedance is a function of piston position, the signal at output 70 is a function of piston position. The amplifier detection circuit of FIG. 7 includes an amplifier and inverts the output signal which, as apparent to those skilled in the art, can be again inverted if desired, although usually not necessary.

The circuit of FIG. 7 may be examined in more detail. The sine wave generator 72 has a counter to produce a 125 kHz square wave which is heavily filtered to produce a 125 kHz sine wave. The sine wave must be very stable and contain little other frequency components. The output from the sine wave generator 72 is applied to a constant current source 74 that creates a 125 kHz sinusoidal current through the ILS coil 30. The constant current generator 74 uses the voltage wave created by the sine wave generator and a sense resistor to create the signal that has constant current characteristics. The current sink from the coil is the ground plane.

The impedance of the coil 30 changes as the disk core moves though it. A four wire measurement is used. Two wires provide the current to the coil and the other 2 measure the voltage across it. The phase adjuster 76 shifts the phase of the sine wave by approximately 90 degrees. This phase shift is created with a low-pass filter. The sine to square circuit 78 creates a square wave from the phase shifted sine wave for use by the synchronous demodulator 80. The instrumentation amp 82 measures the voltage across the ILS coil. This voltage is produced by the 125 kHz sinusoidal current flowing through the coil and is dependent on the ILS coil's impedance. The pre-filter 84 is a front end to the demodulator which prevents unwanted low frequency signals from getting though to the demodulator.

The square wave generator does not produce a signal with exactly 50% duty cycle which changes its average value. Without the high-pass pre-filter, this would allow some unwanted low frequency signals to be passed through to the demodulator. If the duty cycle of the shifted square wave was exactly 50%, this pre-filter may not be necessary. The demodulator 80 is a synchronous demodulator that retrieves the modulated signal from the instrumentation amp. The 125 kHz sinusoidal signal is modulated by changes in the ILS coil's impedance. The demodulator 80 multiplies the signal from the instrumentation amp with the shifted square wave. A low-pass filter is then used to remove the higher frequency components leaving only the modulated signal representing impedance of the ILS coil. Since the shape and level of the square wave is not perfect, it is used to control a switch. When closed, the switch multiplies the signal by 0, and when open it effectively multiplies the signal by 1.

The output signal from the demodulator 80 for a distributed coil embodiment is illustrated as a function of time over one cycle of piston motion in FIG. 8. It shows the output signal as the piston moves from one end of its stroke near one end of the distributed coil to the opposite end of its stroke near the opposite end of the coil and then back again. As is apparent from the graphs, the graph of FIG. 8 has a first part that is simply FIG. 5 inverted followed by a second part that is a minor image of the first part as the piston returns. FIG. 9 shows the same thing for the end concentrated coil and has the same relationship to FIG. 6.

In the event that it is desired to linearize the signal from output 70 in order to obtain a signal having a magnitude that has a linear variation with piston position, prior art techniques for doing say may be employed. For example, the output of the detector circuit of FIG. 7 can be converted from analog to digital format. In a laboratory testing procedure, the piston is moved along the axis of reciprocation making a series of stops separated by small, discrete intervals of translation. At each stop, the output signal magnitude is stored in a digital memory in association with the measured and related position of the piston. The collection of these associated data pairs provides a lookup table. During operation of the sensor of the invention with a detector circuit, the output of the demodulator of the detector circuit is periodically sampled, converted to digital format and used to enter the lookup table and find the piston position that corresponds to the detected magnitude of the output from the demodulator.

It is apparent from FIGS. 5 and 6 that, although the sensor of the present invention provides a signal that is a function of the absolute value of the position of the piston, as described above it does not provide information about the polarity of the piston position; that is the detected magnitude of the output signal does not indicate which side of the center piston position the piston is on. However, that information can be obtained, if desired, using prior art techniques. For example, the polarity of the voltage across the armature coil 30 (FIG. 1) can be monitored and indicates which side of center the piston is on. Alternatively, the asymmetry of the graphs illustrated in the drawings may be used, for example by including the asymmetric part of the graph in the above described lookup table.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A sensor for sensing the translation or position of a reciprocating free piston in a free piston Stirling machine having an outer pressure vessel for containing a working gas and at least one power piston freely reciprocatable in a cylinder within the pressure vessel at a nominal designed maximum stroke along an axis of reciprocation, the sensor comprising:
    (a) a disk mounted to an end face of the piston coaxially with the cylinder and reciprocating with the piston, the disk including a rim around its outer perimeter formed of an electrically conductive material, the disk having a thickness in the axial direction of no more than 30 percent of the nominal designed maximum stroke and radial dimensions perpendicular to the axis greater than its thickness in the axial direction; and
    (b) a coil wound coaxially with the cylinder, spaced outwardly from the outer perimeter of the disk and mounted in fixed position relative to the pressure vessel, the coil having conductor leads for connection to a detector circuit.

2. A sensor in accordance with claim 1 wherein the coil has a length at least substantially equal to the nominal designed maximum stroke and is substantially centered at the center of the nominal designed maximum stroke.

3. A sensor in accordance with claim 2 wherein the coil is wound around exteriorly of the pressure vessel and the pressure vessel is a non-ferromagnetic material.

4. A sensor in accordance with claim 3 wherein the disk comprises a central hub mounted to the piston, an outer peripheral rim and spokes joining the hub to the rim.

5. A sensor in accordance with claim 4 wherein the rim is a conductive material that has more conductivity than the spokes and the spokes are formed of a spring material.

6. A sensor in accordance with claim 4 wherein the reciprocating free piston has a maximum nominal design permissible stroke and the sensor further comprises at least a pair of stops are mounted within the pressure vessel in fixed position relative to the pressure vessel and spaced apart a distance equal to the maximum nominal design permissible stroke equidistantly on axially opposite sides of the center of the nominal designed maximum stroke and aligned to be contacted by the rim of the disk in the event the stroke exceeds the maximum nominal design permissible stroke.

7. A sensor in accordance with claim 6 wherein a spacer is coaxially interposed between the disk and the end face of the piston, the spacer having a diameter less than the diameter of the piston for permitting the spokes to flex between the rim and the spacer.

8. A sensor in accordance with claim 7 wherein the disk has a circular outer periphery.

9. A sensor in accordance with claim 2 wherein the coil is wound with turns being more concentrated at its opposite ends.

10. A sensor in accordance with claim 9 wherein the disk comprises a central hub mounted to the piston, an outer peripheral rim and spokes joining the hub to the rim.

11. A sensor in accordance with claim 10 wherein the rim is a conductive material that has more conductivity than the spokes and the spokes are formed of a spring material.

12. A sensor in accordance with claim 9 wherein the reciprocating free piston has a maximum nominal design permissible stroke and the sensor further comprises at least a pair of stops and mounted within the pressure vessel in fixed position relative to the pressure vessel and spaced apart a distance equal to the maximum nominal design permissible stroke equidistantly on axially opposite sides of the center of the nominal designed maximum stroke and aligned to be contacted by the rim of the disk in the event the stroke exceeds the maximum nominal design permissible stroke.

13. A sensor in accordance with claim 12 wherein a spacer is coaxially interposed between the disk and the end face of the piston, the spacer having a diameter less than the diameter of the piston for permitting the spokes to flex between the rim and the spacer.

14. A sensor in accordance with claim 13 wherein the disk has a circular outer periphery.

15. A sensor in accordance with claim 2 wherein the disk comprises a central hub mounted to the piston, an outer peripheral rim and spokes joining the hub to the rim.

16. A sensor in accordance with claim 15 wherein the rim is a conductive material that has more conductivity than the spokes and the spokes are formed of a spring material.

17. A sensor in accordance with claim 15 wherein the reciprocating free piston has a maximum nominal design permissible stroke and the sensor further comprises at least a pair of stops and mounted within the pressure vessel in fixed position relative to the pressure vessel and spaced apart a distance equal to the maximum nominal design permissible stroke equidistantly on axially opposite sides of the center of the nominal designed maximum stroke and aligned to be contacted by the rim of the disk in the event the stroke exceeds the maximum nominal design permissible stroke.

18. A sensor in accordance with claim 17 wherein a spacer is coaxially interposed between the disk and the end face of the piston, the spacer having a diameter less than the diameter of the piston for permitting the spokes to flex between the rim and the spacer.

19. A sensor in accordance with claim 18 wherein the disk has a circular outer periphery.

* * * * *